Aug. 24, 1937.    H. J. ENGH    2,091,067
VEHICLE HOIST
Filed April 16, 1936
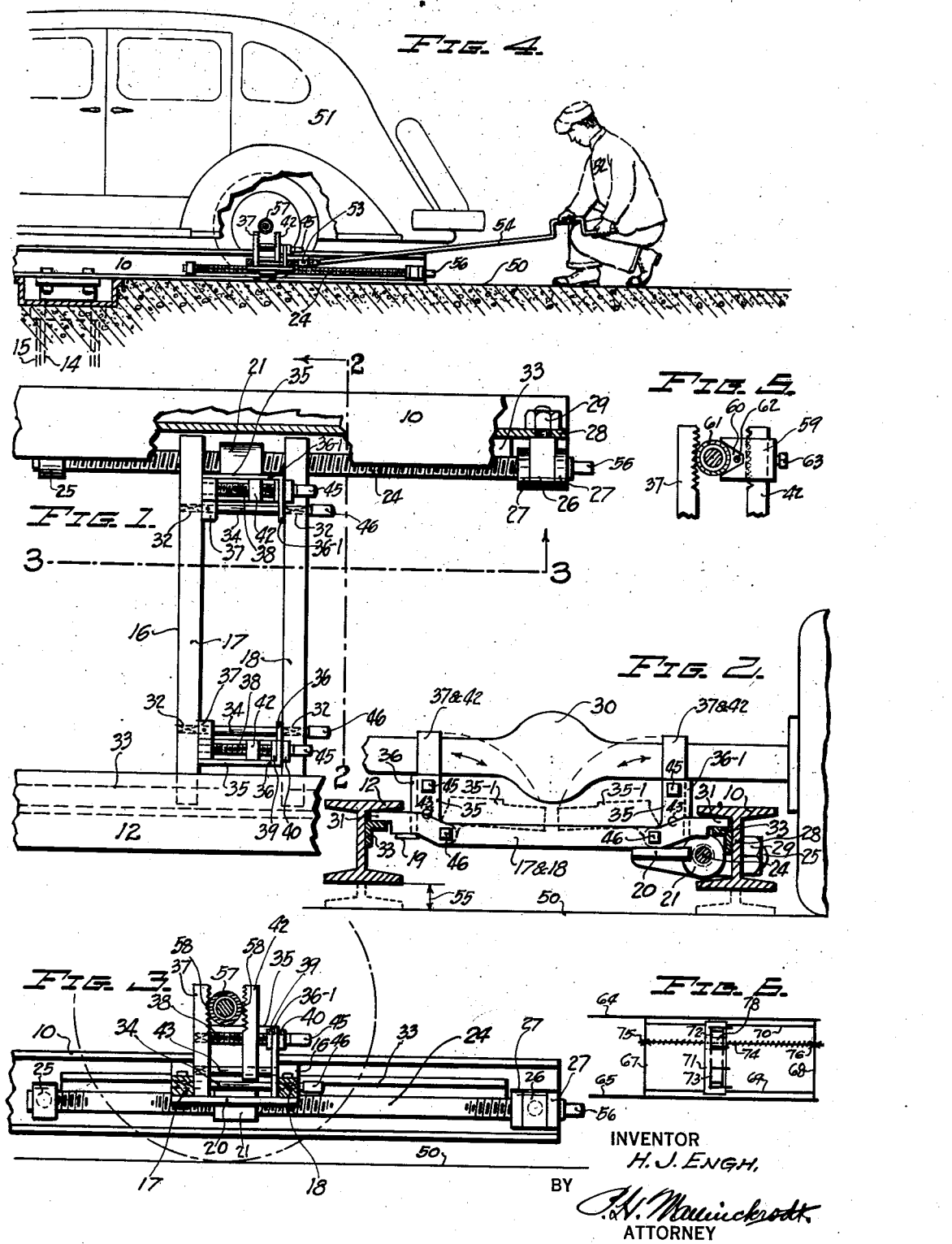
INVENTOR
H. J. ENGH,
BY
ATTORNEY Patented Aug. 24, 1937

2,091,067

UNITED STATES PATENT OFFICE 2,091,067

VEHICLE HOIST

Howard J. Engh, Salt Lake City, Utah, assignor of forty-nine one-hundredths to Arnt Engh, Salt Lake City, Utah Application April 16, 1936, Serial No. 74,638

9 Claims. (Cl. 254—89)

This invention relates to a vehicle hoist, and more especially, a hoist for automotive vehicles, although not necessarily restricted thereto.

The principal object of the invention is to fasten an automotive vehicle securely to a supporting frame, which latter is mounted so it can be elevated mechanically, pneumatically or hydraulically, for purposes of greasing, cleaning or performing other servicing operations.

A second object is to provide means whereby an attendant is enabled to move a portable carriage mechanically along the hoist frame with the assurance of personal safety while a vehicle is being "spotted" or set, preliminary to lifting it.

A third object is to provide means whereby an attendant may perform all the operations necessary for adjusting the portable carriage to the position of the spotted vehicle, and then fastening the vehicle to the carriage, without incurring the risk of serious accidents.

A fourth object is to equip a vehicle hoist with safety devices which are simple, relatively inexpensive, and convenient in operation.

In vehicle hoists as heretofore constructed, the vehicle merely rests on the framework of the hoist and is held thereon by its own weight. This custom involves considerable hazard, since the bearing of the car or other vehicle on the hoist frame is rather uncertain, and a comparatively slight lurching of the car to one side or the other, frequently causes it to roll off the hoist.

In many older hoists the front axle bears at two points on the frame of the hoist, while a third bearing is had by the differential casing of the car on a loose plate which spans the usual side beams of the frame. This plate must be pushed back or forth by hand to suit the particular spotted position of the car. To move the supporting plate, one attendant must lie on his back and push himself under the vehicle, and in this awkward and hazardous position, place the plate by hand in a position to register with the differential casing. Sometimes the attendant has the convenience of a low truck on casters on which he lies face up, thus more easily reaching his objective, but in any case, inconvenience and danger are involved. To speed up service, two attendants usually work together, and while one is locating the supporting plate under a car, the other is spotting the car over the hoist, and then, operates the hoist to elevate it. Not infrequently, the attendant under the car is injured bodily, or has one or both hands crushed in the hurried attempt to properly place the plate.

In addition, other hazards are incurred after a car is on the hoist. For example, the plate supposed to support the rear of the vehicle, may inadvertently be shifted out of place or an attendant in attempting to save time by performing some necessary operation, such as cleaning the inside, may cause the car to overbalance and roll off the rack. Frequently too, after a car is elevated on the hoist, the driver may wish to enter the car, and in climbing up, may overturn the same with disastrous consequences.

The use of my improved hoist removes the hazards otherwise incurred.

A desirable embodiment of the invention is illustrated in the accompanying drawing, in which:

Fig. 1 represents a fragmentary plan, certain portions being broken away to show hidden parts;

Fig. 2, a cross-section taken on the line 2—2 in Fig. 1;

Fig. 3, a longitudinal section taken on the line 3—3, in Fig. 1;

Fig. 4, a fragmentary elevation partly in section, corresponding to Fig. 3, but drawn to a reduced scale, and showing a car spotted, just prior to clamping;

Fig. 5, a fragmentary elevation showing a minor detail; and,

Fig. 6, a plan, in diagrammatic form, showing another construction.

Referring to the drawing, the numerals 10 and 12 indicate the customary longitudinal side beams included in the frame of a greasing hoist of the type having a plunger 14 adapted to be raised pneumatically or hydraulically. This plunger may be operatively disposed in a cylinder 15, in a manner that is well known, and may be provided with the usual control mechanism. At the rear portion of the frame is a movable carriage 16, which extends transversely of the frame, and in this instance, comprises two stringers 17 and 18, suitably spaced apart from each other. Connecting the two stringers at one end may be a crosspiece 19, and at the other end, a flange 20 projecting inwardly from a boss 21, the latter being internally threaded to form a nut. At 24 is a rotatable screw which engages the boss or nut 21, and this screw extends longitudinally along one of the side beams, for example, the one at 10. The screw may be journaled in any suitable manner, for example in two eye-bolts 25 and 26, and be retained in place longitudinally by means of collars 27 on either side of one of the eye-bolts, for example, the one at 26. The eye-bolts may extend through the web 28, and be secured by nuts 29.

The stringers 17 and 18 may have their central portion depressed, as indicated in Fig. 2, in order to be cleared by objects moving over them, such as the differential casing 30 of a car being spotted over the hoist.

The carriage 16 is mounted for traveling back and forth longitudinally along the hoist frame, and to this end may be carried on track members 33 secured to the respective sidebeams 10 and 12 by any suitable method, such as riveting or welding. The ends of the stringers 17 and 18 may be notched so as to provide bearing fingers 31 adapted to slide along the track members.

Journaled at 32 near each end of the carriage frame, are hinge pins 34, upon which are rigidly mounted, clamps 35, these clamps having the L-shaped frames or brackets 36 and 36—1, respectively. To the extremity of the long leg of each of the frames may be fastened, for instance, by welding, a stationary jaw member 37. An adjustable jaw member 42 is mounted opposite, and in cooperative relation to, the jaw member 37. The lower portion of the adjustable jaw may engage a guide rod 43, one end of the latter being secured in the jaw 37, and the other end in the bracket 36 or 36—1, as the case may be. At 38 is an adjusting screw which may be threaded in, and engage, the movable jaw, the adjusting screw itself being held against longitudinal displacement by means of collars 39 and 40. Each adjusting screw 38 has a head or shank 45, and each hinge pin 34, a head or shank 46, these shanks being detachably engageable by a socket or other wrench for a purpose presently to be explained. By rotating either of the screws 38, the corresponding jaw 42 is adjusted back or forth as may be required. Limited rotation of either of the hinge pins 34, results in swinging the corresponding clamp back or forth, as indicated by a double pointed arrow in Fig. 2, from an upright or erectile position indicated in full lines, to a retracted or depressed position indicated in dotted lines, or vice versa.

In using this hoist, assuming that the frame beams 10 and 12 are resting on a floor 50, the attendants first make sure that the clamps 35 are in the retracted position 35—1 (Fig. 2) and that the clamp jaws 37 and 42 are open wide enough to receive the axle housing 57. A vehicle, such as a motor car 51 (Fig. 4), may then be suitably spotted over the hoist by one attendant (not shown) while another attendant 52, manipulating a swiveled socket wrench 53 by means of an attached long handle 54, first attaches this wrench to a shank 56 of the longitudinal screw 24, and turns the latter until the carriage 16 is properly placed to bring the opening between jaws 37 and 42, substantially into registry with the axle housing 57 (Fig. 4) of the car. The second attendant then removes the socket wrench from the shank 56 and transfers it to one and then to the other of the shanks 46 of hinge pins 34 in order to swing the corresponding clamp into the upright position indicated in Fig. 2. Next, one of the attendants causes the hoist to rise, as indicated at 55, Fig. 2, until the upper sides of frames 36 and 36—1 come into contact with the axle housing. At this time, the second attendant transfers the socket wrench to the shank 45 of one and then the other of the adjusting screws 38, and tightens the clamps until the axle housing is securely held in the serrations or teeth 58 of the clamp jaws.

The car is now safely anchored on the hoist, and may be lifted in the usual manner with the assurance that it is securely held and cannot roll off.

After the greasing or other operation has been completed, the hoist may be lowered in the usual manner until the wheels are near the floor, but not touching, at which point the hoist is held stationary until an attendant can unscrew the clamp jaws 42. When this has been done, the hoist may be lowered completely, so that the frame again rests on the floor. Then, by flipping the clamps back into the retracted position indicated by the dotted lines 35—1 in Fig. 2, the car may be rolled freely away from the hoist, and the hoist be ready to receive another car.

If desired, the front end of a hoist may also be equipped with an adjustable carriage and clamping mechanism similar to that just described, in order to secure a car to the hoist in front as well as in the rear.

In some modern cars, an oil line extends along one side of the axle housing, and in order to clear this oil line, a special fixture is provided. This is illustrated in Fig. 5, and consists of a detachable block 59 having a V-shaped opening 60, the slanting sides of which contact the axle housing 61, but leave the crotch of the V open around the oil line 62. The block 59 may be slipped over either one or the other of the jaws 37 or 42, in this instance 42, and be fixed thereon by means of the set screw 63.

As an example of another construction of the invention, indicated in diagrammatic form in Fig. 6, the side-beams 64 and 65 may be connected together by means of cross-beams 67 and 68. These cross-beams may carry the rails 69 and 70 on which is mounted a carriage 71, carrying the axle clamps 72 and 73. A rotatable screw 74, journaled in bearings 75 and 76, may engage a threaded nut 78, mounted on the carriage 71. The operation of the different parts is similar to the construction already described herein.

The cross-members 67 and 68, and rails 69 and 70, may constitute parts of an auxiliary frame which is attachable to the main frame of a hoist. Such an auxiliary frame may be portable and may be made adaptable for placing in existing hoists of different kinds, so that it is not necessary to discard present hoist installations in order to secure the benefits accruing from the invention.

While specific embodiments of my invention are herein described, it is to be understood that numerous changes can be made therein without departing from the spirit and scope of the following claims.

Having fully described my invention, what I claim is:

1. Hoisting apparatus, including in combination, a hoisting mechanism, a frame mounted thereon and disposed to receive a vehicle, a carriage disposed for movement along said frame, means for securing the carriage to said frame, and means for anchoring the vehicle to said carriage, the said anchoring means comprising jaws movably attached to the said carriage and disposed in opposing relation one to another, the said jaws being adapted to receive a fixed part of the vehicle between them, and means operative to cause the said opposing jaws to grip the said fixed part between them.

2. Hoisting apparatus, including in combination, a hoisting mechanism having a frame adapted to support a vehicle thereon, a carriage movable back and forth along said frame, means operative to selectively secure the carriage in successive positions along the frame, and means operative to clamp the axle structure of said vehicle to said carriage, the said clamping means comprising two mutually separable clamps mounted for erection or depression on the carriage and for gripping the axle of a vehicle between them.

3. Hoisting apparatus, including in combination, a hoisting device disposed to support a vehicle, a carriage movable back or forth on the said hoisting device, means operative to hold the carriage in position relative to the hoisting device, and means comprising mutually separable clamps mounted so as to be selectively depressible or erectable for clamping the vehicle to the said carriage, the said clamping means being manually operable from a point remote from the hoisting device.

4. Hoisting apparatus, including in combination, a hoisting mechanism, a frame consisting of two longitudinal beams spaced apart from each other, mounted on said mechanism, a carriage adapted to travel back or forth along the said beams and to be supported thereby, clamps opposingly mounted and adapted to engage the axle structure of a vehicle, said clamps being hinged in pairs so as to be retractable toward the carriage, and means operative to move the carriage mechanically.

5. A hoisting mechanism having a frame adapted to support a vehicle, said frame comprising two beams extending longitudinally under the vehicle, a carriage extending transverse of the said beams and adapted to be supported thereby, a screw extending longitudinally of the beams and rotatably secured in bearings fixed relative to the beams, a nut fixed on the carriage and adapted to engage the said screw, means for fixedly securing the axle structure of a vehicle to said carriage, and means for rotating the said screw.

6. A vehicle hoist having a hoisting mechanism and a frame adapted to support a vehicle; a carriage movable mechanically back and forth along the said frame, and clamps mounted at both ends of the carriage, the said clamps being adapted to support the axle structure of a vehicle at two points spaced apart from each other, each clamp further, being composed of two jaws adapted to be opened to receive the axle and being operable selectively to move down so as to pass under the axle when detached therefrom.

7. A vehicle hoist according to claim 6, wherein the clamps are depressible around a pivotal axis extending transverse to the axle of the vehicle.

8. A vehicle hoist having a frame disposed to receive a vehicle, a carriage member adapted to move along the said frame, a clamp hinged on the carriage so as to have an erected position transverse to an axle of the vehicle, and so as to be selectively depressible to pass under the said axle, the said clamp including two operable jaws disposed in the erected position of the clamp to receive the axle, and means operative to cause the jaws to forcibly grip the axle.

9. A vehicle hoist in accordance with claim 8, wherein the clamp is operable from a point safely remote from the loaded hoist.

HOWARD J. ENGH.